United States Patent
Cmielowski et al.

(10) Patent No.: US 10,346,290 B2
(45) Date of Patent: Jul. 9, 2019

(54) AUTOMATIC CREATION OF TOURING TESTS

(71) Applicant: International Business Machines Corporation, Armonk, NY (US)

(72) Inventors: Lukasz Grzegorz Cmielowski, Cracow (PL); Tymoteusz Gedliczka, Cracow (PL); Andrzej Jan Wrobel, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 15/339,691

(22) Filed: Oct. 31, 2016

(65) Prior Publication Data

US 2018/0121331 A1    May 3, 2018

(51) Int. Cl.
G06F 11/36    (2006.01)
(52) U.S. Cl.
CPC ................... *G06F 11/3672* (2013.01)
(58) Field of Classification Search
CPC .................................... G06F 11/3672
USPC ........................................ 717/124
See application file for complete search history.

(56) References Cited

U.S. PATENT DOCUMENTS

| 6,895,577 | B1 * | 5/2005 | Noble ................. G06F 11/3676 |
| | | | 714/38.12 |
| 7,359,865 | B1 * | 4/2008 | Connor .............. G06Q 10/0635 |
| | | | 705/7.28 |
| 8,473,913 | B2 | 6/2013 | Noller et al. |
| 8,555,253 | B2 | 10/2013 | Shufer et al. |
| 8,607,208 | B1 * | 12/2013 | Arnold .................... G06F 8/656 |
| | | | 717/153 |
| 9,632,916 | B2 * | 4/2017 | Alexander .......... G06F 11/3676 |
| 2002/0082846 | A1 * | 6/2002 | Chang .............. G05B 19/41875 |
| | | | 705/1.1 |
| 2003/0196190 | A1 * | 10/2003 | Ruffolo ............... G06F 11/3672 |
| | | | 717/124 |

(Continued)

OTHER PUBLICATIONS

Francino, Six tours for exploratory testing the business district of your application, SearchSoftwareQuality (Mar. 8, 2013) retrieved from https://web.archive.org/web/20130308145645/https://searchsoftwarequality.techtarget.com/tip/Six-tours-for-exploratory-testing-the-business-district-of-your-application on Oct. 26, 201.*

*Primary Examiner* — Duy Khuong T Nguyen
*Assistant Examiner* — Theodore E Hebert
(74) *Attorney, Agent, or Firm* — Patterson + Sheridan, LLP (57) ABSTRACT

The disclosure provides an approach for automatically analyzing data related to software development, such as the number of defects, number of code line changes, number of test cases covering code, etc., and creating exploratory tests based on tour templates. In one embodiment, a test generating application matches descriptions, tags and/or keywords in the tour templates with data from development tools used to develop and test software. The test generating application combines the tour templates with the matching data to create exploratory tests for testers to perform. In addition, the test generating application may rank the created tests based on a measure of importance and determine a number of highest ranking tests or test types that can be executed given a capacity of the software tester or testing team. The highest ranking tests may then be provided to the software tester or testing team to perform prior to the software's release.

18 Claims, 4 Drawing Sheets

(56) References Cited

U.S. PATENT DOCUMENTS

| | | | |
|---|---|---|---|
| 2006/0265188 A1* | 11/2006 | French | G06F 11/3676 |
| | | | 702/185 |
| 2007/0174023 A1* | 7/2007 | Bassin | G06F 11/3688 |
| | | | 702/186 |
| 2009/0254887 A1* | 10/2009 | Rossi | G06F 11/3688 |
| | | | 717/126 |
| 2010/0057693 A1* | 3/2010 | Himstedt | G06F 11/3672 |
| | | | 707/E17.005 |
| 2011/0004865 A1* | 1/2011 | Brown | G06F 11/3688 |
| | | | 717/113 |
| 2011/0022541 A1* | 1/2011 | Miles | G06Q 40/00 |
| | | | 705/36 R |
| 2011/0161936 A1* | 6/2011 | Huang | G06F 11/3688 |
| | | | 717/130 |
| 2011/0231817 A1* | 9/2011 | Hadar | G06Q 10/00 |
| | | | 717/120 |
| 2012/0089964 A1* | 4/2012 | Sawano | G06F 11/3684 |
| | | | 717/124 |
| 2012/0266137 A1* | 10/2012 | Alexander | G06F 11/3676 |
| | | | 717/124 |
| 2013/0346956 A1* | 12/2013 | Green | G06F 8/65 |
| | | | 717/168 |
| 2016/0055079 A1* | 2/2016 | Hanna | G06F 11/3692 |
| | | | 717/135 |
| 2016/0350207 A1* | 12/2016 | Cmielowski | G06F 11/3684 |
| 2016/0378618 A1* | 12/2016 | Cmielowski | G06F 11/1479 |
| | | | 714/38.1 |

* cited by examiner

AUTOMATIC CREATION OF TOURING TESTS

BACKGROUND

Field of the Invention

Embodiments presented in this disclosure generally relate to software testing and quality assurance. More specifically, embodiments pertain to techniques for automatically creating exploratory tests.

Description of the Related Art

The software development cycle requires a quality assurance process to verify a software's quality before it is released to customers. Traditionally, the quality assurance process involves developers, project managers, and others sitting down to brainstorm test scenarios and plans to run prior to each release of the software. However, manual brainstorming sessions can be resource and time intensive. Sometimes, there is not enough time for such thorough manual analysis, such as in the case of continuous delivery in which releases of software are iterative and frequent (e.g., weekly or every two weeks). For example, it may take a team of four engineers two days to brainstorm, formalize, and save tests for a minor release even when the iteration (a single development cycle) for each minor release is only ten days.

SUMMARY

According to an embodiment, a computer-implemented method of generating a test plan is provided. The method generally includes receiving one or more templates specifying respective types of test tours. The method further includes matching data retrieved form software development tools with the one or more templates. In addition, the method includes generating test tours for the matching data based on the one or more templates, where each of the test tours specifies at least a pattern of testing to perform on a portion of the software associated with the matching data.

Additional embodiments include a computer-readable storage medium storing an application, which, when executed on a processor, performs the above recited method as well as a system having a processor and a memory storing an application which, when executed on the processor, performs the above recited method.

BRIEF DESCRIPTION OF THE DRAWINGS

So that the manner in which the above recited embodiments are attained and can be understood in detail, a more particular description of aspects of this disclosure, briefly summarized above, may be had by reference to the appended drawings. It is to be noted, however, that the appended drawings illustrate only typical embodiments and are therefore not to be considered limiting of its scope, for the invention may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments disclosed herein provide techniques for automatically analyzing data related to software development, such as the number of defects, number of code line changes, number of test cases covering code, and the like, and creating exploratory tests based on tour templates. As used herein, a "tour" refers to a pattern, or strategy, of testing used to uncover defects in the software. A tour may generally be defined by a tour type (e.g., a user interface tour that focuses on how the user interface looks or performs, an in-depth tour that looks beyond the user interface and rigorously tests a particular area of the software, etc.) and attractions in the software for which the type of tour should be performed. A tour template is a repository or file which includes a description, tags, and/or keywords for a particular tour type. In one embodiment, a test generating application matches the description, tags and/or keywords in such tour templates with data from software development tools, which may include any tools used to develop and test software, such as an application providing an automated testing framework. The test generating application then combines the tour templates with the matching data to create exploratory tests for software testers to perform. In addition, the test generating application may rank the exploratory tests based on a measure of importance and determine a number of highest ranking tests that can be executed given a capacity of the software tester or testing team. The highest ranking tests may then be provided to the software tester or testing team to perform prior to the software's release.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
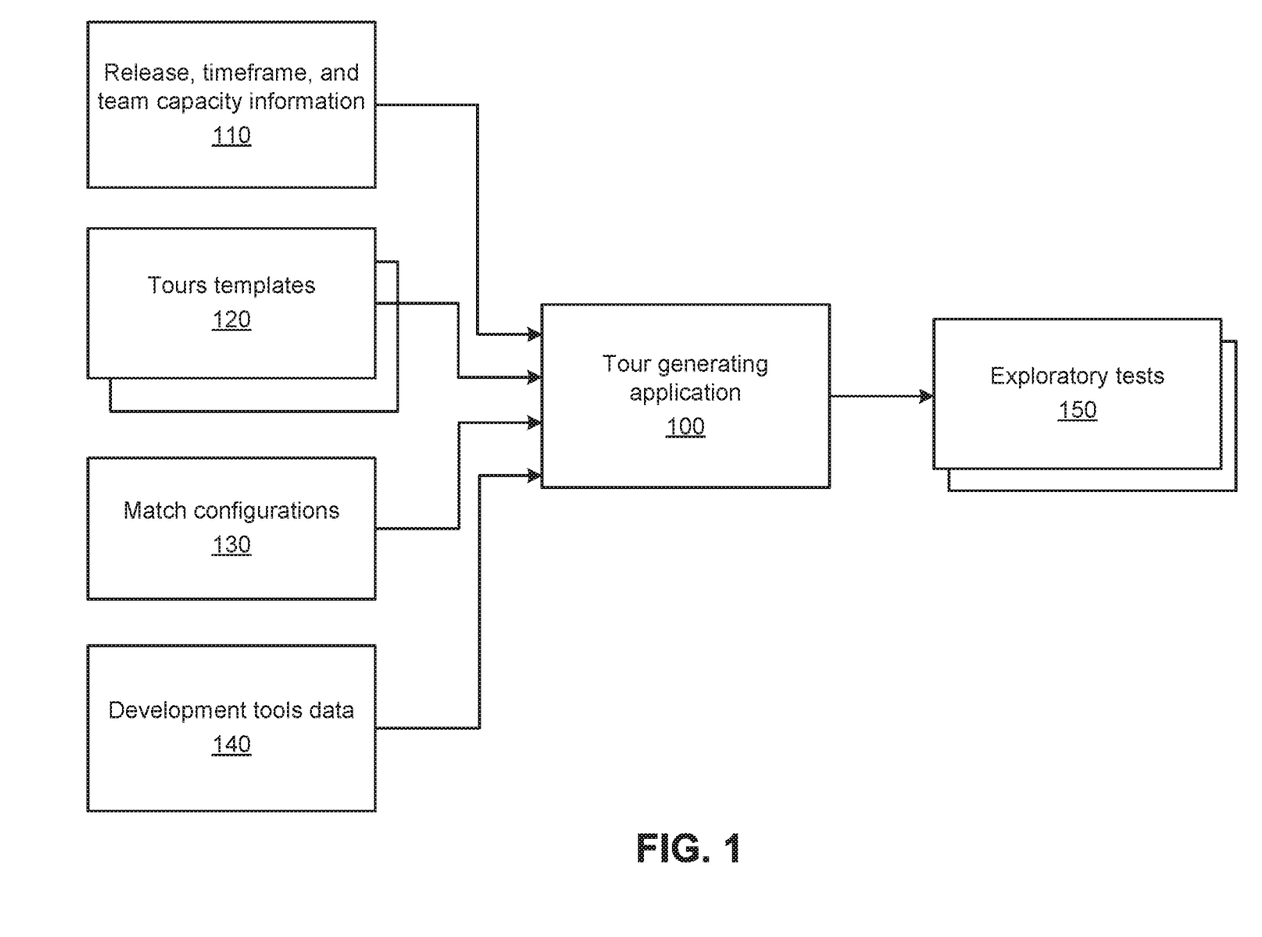
FIG. 1 illustrates an approach for automatically creating exploratory tests, according to an embodiment.

With reference now to FIG. 1, an approach for creating exploratory tests according to an embodiment is shown. As shown, a test generating application 100 (also referred to herein as the "test generator") receives as inputs release, timeframe, and team capacity information 110; tour templates 120; match configurations 130; and software development tool data 140. Based on these inputs, the test generator 100 automatically generates exploratory tests 150 for validating the software's quality.

The release, timeframe, and team capacity information 110 may be provided by a user, such as a test manager or test lead. The release information may include a version number, name, code name, or the like, and the test generator 100 uses such information to identify the appropriate code and data associated with the release. The timeframe information specifies the amount of time for testing, and the capacity specifies the amount of productivity that can be achieved in a single day. For example, the timeframe may specify that two weeks are allotted for testing before a release (i.e., ten calendar working days), and the capacity may specify a number of component-subcomponent-impact (CSI) that software testers on the testing team are able to test in a single day. It should be understood that the timeframe and team capacity may also be specified in other ways. In one embodiment, the team capacity may also be specified in person days. For example, four test engineers who are available for two weeks would give a total team capacity of forty person days.

The tour templates 120 are repositories or files, such as text files, that specify respective types of tours. In one embodiment, each tour template may include a description of a type of tour, tags associated with the tour, and/or keywords associated with the tour. As discussed, a "tour" refers to a pattern, or strategy, of testing used to uncover defects in software. Like a tourist exploring an unknown area, a software tester may explore the code using various types of tours. For example, as used herein, a user interface (UI) tour is a type of tour focused on the superficial UI of the software and how the UI looks or performs. An example template for such a UI tour may include the following description: "This tour is not about function or substance; it's about looks and first impressions. During the UI tour, the focus is not on functionality or real interaction. It's only on the interface. Take the tour and watch the interface elements. Do they look good? Do they render properly, and is the performance good? As you make changes, does the GUI refresh properly? If the software is using color in a way to convey some meaning, is this done consistently?" Other types of tours are discussed in greater detail below with respect to FIG. 2.

As the tour templates 120 only specify types of tours and not tours of specific portions of software, the test generator 100 may identify areas of interest, also referred to herein as "attractions," in the software where the tours should be performed. Illustratively, the test generator 100 may use the match configurations 130 to identify the areas of interest. In one embodiment, the match configurations 130 may include mappings between tour templates and queries for retrieving data relating to the tour templates from software development tools. In alternative embodiments, the test generator 100 may use matching algorithms or modules, such as a machine learning algorithm or a text analytics tool (e.g., Apache Lucene®), to compare the tour description, tags, and/or keywords in each tour template with the development tools data. As used herein, software "development tools" generally refers to any tools used in developing and testing software, such as code repositories; test repositories; test management tools; test execution records; CSI risk maps; defects tracking tools which track bugs in the code; defect repositories; problem management record (PMR)/authorized program analysis report (APAR) repositories; software documentation; test automation framework tools providing environments for test planning, construction, and execution; work item repositories storing work items that track tasks such as enhancements, defects, or plan items and that may link to source code; and the like. Examples of software development tools include IBM's Rational Team Concert™ and Rational Quality Manager.

It is assumed herein that the software development tools permit CSI information specifying test paths to be associated with the source code and related data maintained by the development tools (e.g., bugs being tracking in the source code if the development tool is a defects tracking tool). It should be understood that a component of software refers to a module, package, service, or the like that encapsulates a set of related functions or data, and a subcomponent is a component within a component. Further, impact refers to the criterion or criteria being tested. For example, an online shopping application may include a "shopping cart" component, an "add items" to the cart subcomponent, and a "performance" impact, and this CSI defines the test path as being: test the performance of adding items to the cart. When the tester adds an item to the cart and the software takes a long time to respond, this may be deemed a performance issue. Other types of impacts may include capability, usability, and the like. In one embodiment, the CSIs may be user-defined. For example, when a software developer implements the add items to cart feature and creates a corresponding work item in the code repository, the user may be prompted to also input CSI(s) describing one or more components, subcomponents, and impacts associated with the new code. As another example, software testers may provide CSIs when reporting defects so that the CSIs corresponding to identified defects are known.

As discussed, the test generator 100 generates exploratory tests 150 by matching tour templates 120 with data retrieved from development tools using either matching configurations 130 or matching algorithms or modules. In one embodiment, the test generator 100 may create exploratory tests 150 as repositories or files which include both the tour template descriptions of the tours and matching CSIs (which is itself a form of development tools data) that the tours are to be performed for based on software development tools data such as the number of defects, number of code line changes, number of test cases covering code, etc., as discussed in greater detail below. For example, the UI tour for testing UIs may be matched based on UI-related issues indicated in orthogonal defect classification (ODC) user interface data to the Shopping cart-Add-Performance CSI, among others, and the test generator 100 may then create a file which includes the template description of the UI tour, the Shopping cart-Add-Performance CSI, and other CSIs relevant to the UI tour. An example of such a file may include the following text:

The User Interface Tour

This tour is not about function or substance; it's about looks and first impressions. During the UI tour, the focus is not on functionality or real interaction. It's only on the interface. Take the tour and watch the interface elements. Do they look good? Do they render properly, and is the performance good? As you make changes, does the GUI refresh properly? If the software is using color in a way to convey some meaning, is this done consistently?
Attractions:
Shopping cart-Add-Performance
Data presentation-BIRT reports-Performance
Data presentation-Topologies-Usability
UI-Login panel-Usability
UI-Details pane-Performance In this example, attractions listing the CSIs (e.g., "Shopping cart-Add-Performance") that the UI tour should be performed for are combined with a description of the UI tour from the tour template. Such a file may be provided to a software tester who then performs the UI tour tests on the listed CSIs according to the description of the tour. For example, the software tester may test the Shopping cart- Add-Performance CSI by adding an item to the cart and checking the UI's performance during the adding of the item. In another embodiment, the various tour descriptions (e.g., for the UI tour, the in-depth tour, etc.) and matching CSIs may be listed together in one test plan file or repository that is provided to the software tester or testing team.

The test generator 100 may also rank the exploratory tests 150 and determine a number of highest ranking tests that can be performed given the timeframe and capacity information 110. In one embodiment, the test generator 100 may rank the exploratory tests 150 based on previous customer-reported issues covered by the tests' 150 tours. In such a case, the test generator 100 may rank tests 150 covering code with more previously reported issues higher, and then select the highest ranking test tours whose time requirements sum to less than the total capacity. Doing so helps ensure that problematic code with more previously reported issues are tested, while limiting the number of tests to what the testing team can handle given the capacity. For example, the customer-reported issues may be in the form of PMRs/APARs. PMRs are used by customers in the field to document problems and to record the work that a support center does to fix the problems such as providing configurations or hints to the customer, and APARs also document problems or suspected defects but may require code changes such as new releases to fix the defects. Assume the number of PMRs/APARs for the UI tour and an areas-of-interest tour are as shown in brackets below:

UI tour [8]: Cart-Add-Performance [5]
Finalization-Credit Cart-Capability [0]
Welcome page-Login-Capability [3]
Areas-of-interest tour [5]: Cart-Finalization-Capability [0]
  Item catalog-Multiple selection-Capability [2]
  Item catalog-Selection drop-Capability [3]

Then, if the timeframe is 10 working days and the capacity is 3, the test generator 100 may select the top ranking tour tests up to the total testing capacity of 30, i.e., $\Sigma$ (CSIs in tour tests)<=Capacity*Timeframe. In this example, the test generator 100 would select the top ranking tour tests, starting with the UI tour test of "Cart-Add-Performance," while ensuring that the sum of all CSIs within the test tours does not exceed the Capacity*Timeframe of 30. Note, this example assumes that execution of a single CSI takes 1 person day (referred to as "velocity"), such that the capacity of 3 and timeframe of 10 gives a total of 30 person days in which 30 CSIs may be executed. In another embodiment, the test generator 100 may filter the tests at different levels, such as filtering the tour types in the tours template repository and filtering the actual tour tests that are created. For example, based on input or feedback from customers or on the number of issues reported for particular CSIs/tests, the test generator 100 may identify that certain features/CSIs are more important from the customer point of view and select tour tests associated with these features/CSIs.

Figure 2:
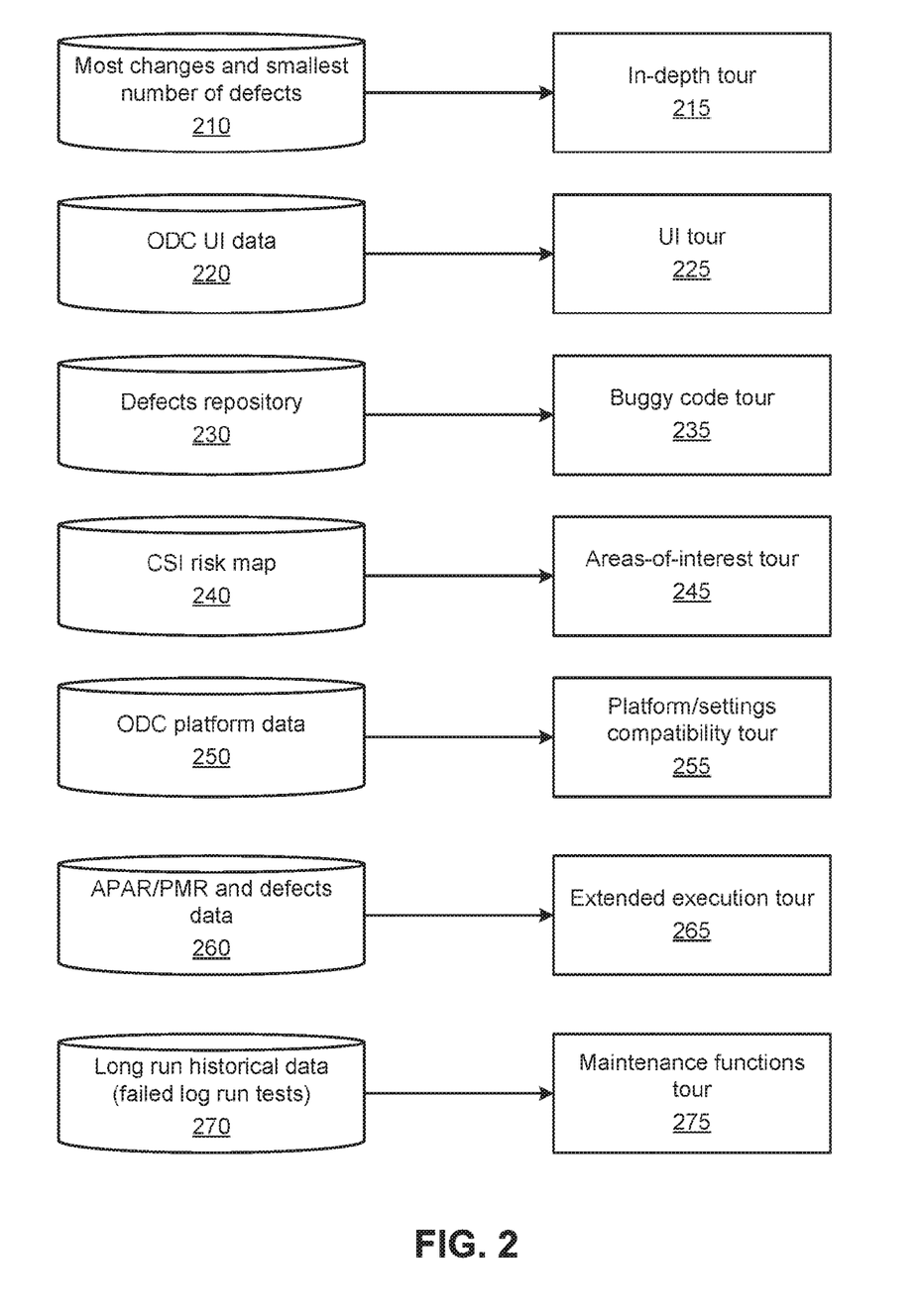
FIG. 2 illustrates an approach for matching touring test templates to data retrieved from software development tools, according to an embodiment.

FIG. 2 illustrates an approach for matching touring test templates to data retrieved from software development tools, according to an embodiment. This automated approach replaces the human brainstorming traditionally required to identify portions of software that need to be tested and create test scenarios to cover the identified portions of software.

As shown, the test generator 100 queries a code repository (or work item repository) and defects repository to retrieve information indicating code with the most changes and smallest number of defects 210 which is then used to identify CSIs matching an in-depth tour template 215, queries ODC user interface data 220 to retrieve information identifying CSIs matching a UI tour template 225, queries defects repository data 230 to retrieve information identifying CSIs matching a buggy code tour template 235, queries CSI risk map data 240 to retrieve information identifying CSIs matching an areas-of-interest tour template 245, queries ODC platform data to retrieve information identifying CSIs matching a platform/settings compatibility tour template 255, queries PMR/APAR data 260 to retrieve information identifying CSIs matching a maintenance functions tour template 265, and queries historical data on failed long run tests 270 to retrieve information identifying CSIs matching an extended execution tour template 275.

The in-depth tour is a type of tour that does a deep dive into a particular area of the software and asks hard questions, as opposed to a superficial look at the UI as in the case of the UI tour. Continuing the Shopping cart-Add-Performance example, the in-depth tour may involve checking whether selected items placed in the cart are added correctly and quickly. As shown, the match configuration 130 may include a mapping between the in-depth tour template 215 and a query for selecting CSIs associated with software development tools data 210 indicating portions of code with many changes but few previously identified defects. In one embodiment, the CSIs associated with a large number of changes (e.g., in terms of lines changed) in the code repository (or work item repository) but few previously identified defects in the defects repository may be matched to the in-depth tour by running such a query. It should be understood that the number of CSIs returned by this type of query may be limited through configuration. The portions of code with many changes but few identified defects may not have been tested well enough yet.

The UI tour is a type of tour focusing on the UI of the software rather than function or substance. A tester taking such a UI tour may watch the UI while taking the tour (e.g., adding an item to a shopping cart) and see if the UI elements look good and are consistent, render properly, refresh properly, have good performance, or the like. As shown, the match configurations 130 may include a mapping between the UI tour template 225 and a query for selecting CSIs based on ODC UI data 220. ODC turns semantic information in a software defect stream into a measurement on the process. In one embodiment, the ODC UI data may include a UI usability/UX/GUI or other UI-related issue type. For example, work items in the work items or code repository may include ODC fields set to the Usability/UX/GUI or other UI-related issue. In such a case, the test generator 100 may match the UI-related issues in the ODC UI data with the UI tour template 225 by running such a query so that the CSIs associated with components or subcomponents with UI-related issues are tested.

The buggy code tour is a type of tour that visits portions of code that have previously been identified as having a relatively large number of bugs. As shown, the matching configurations 130 may include a mapping between the buggy code tour template 235 and a query based on defects repository data 230 which stores previously identified bugs. In one embodiment, CSIs for features associated with the highest number of defects in the defects repository may be matched to the buggy code tour template 235 by running such a query.

The areas-of-interest tour is a type of tour involving navigating to certain specified areas of interest in the software, in an order, until all of the areas of interest have been visited. As shown, the matching configurations 130 may include a mapping between the areas-of-interest tour template 245 and a query based on mapping CSI risk map data 240. The CSI risk map is a heat map showing risk factors assigned to each CSI, with the risk factor indicating a probability of hidden defects being detected in a corresponding CSI. For example, such a CSI risk map may be provided by a user. In one embodiment, CSIs with the highest risk factors in the CSI risk map, taking into account development metrics such as the number of tests, the test execution results, number of changes, number of APARs/PMRs, static analysis of code, etc., may be matched to the areas-of-interest tour template 245 by running the query in one embodiment.

The platform/settings compatibility tour is a type of tour in which the same software features are accessed using different platforms, settings, or privilege levels to see if the user has substantially the same experience with each. As shown, the matching configurations 130 may include a mapping between the platform/settings compatibility tour template 255 and a query based on mapping ODC platform data 245. In one embodiment, the ODC UI data may include a platform/translation/globalization issue type. For example, work items in the work items or code repository may include ODC fields set to platform/translation/globalization. In such a case, the test generator 100 may match CSIs associated with such platform/translation/globalization issues in the ODC platform data with the platform/settings compatibility tour template 225 by running the query so that the software's compatibility with those platforms may be tested.

The maintenance functions tour is a type of tour that tests maintenance functions such as backups or performance-intensive tasks that the software executes when the user is not active. As shown, the matching configurations 130 may include a mapping between the maintenance functions tour template 265 and a query based on PMR/APAR data 260. As discussed, PMRs are used by customers in the field to document problems and to record the work that a support center does to fix the problem such as providing configurations or hints to the customer, and APARs also document problems or suspected defects but may require code changes such as new releases to fix the defects. In one embodiment, the test generator 100 may match CSIs associated with maintenance/installation instructions from the software's documentation, combined with doc/install defects, PMR, or APARs, with the maintenance functions tour template 265 by running the query. The maintenance/installation instructions are sections of the software documentation describing installation and maintenance of the software. For example, installation instructions may include instructions on how to install the software, installation types, and the like, and maintenance instructions may include instructions on how to tune running software, how to clean unnecessary/out of date records from a database, and the like. Doc/install defects are defects reported against documentation and installation of software. For example, a user may report that the documentation is not up-to-date and refers to elements that no longer exist in the current version of software.

The extended execution tour is a type of tour in which the software is kept running for an extended period of time without restarting. As shown, the matching configurations 130 may include mapping between the extended execution tour template 275 and a query based on long run historical data 270. The long run historical data 270 may include the history of tests run for, e.g., more than a given number of days (e.g., more than 5 days). In one embodiment, the test generator 100 may run the query to identify historical data indicating software features (CSIs) that did not pass automated or manual long run tests in the past, and the test generator 100 may then create an extended execution tour that visits those features.

Although discussed with respect to the match configurations 130 which specify queries mapping particular types of software development tools data to tour templates, it should be understood that these are only examples of match configurations 130 and the match configurations 130 disclosed herein may be extended and modified based on, e.g., the processes adopted by the particular project or team. Further, in some embodiments, matching algorithms or modules, such as a machine learning algorithm or a text analytics tool (e.g., Apache Lucene®), may be used in lieu of match configurations 130 to automatically determine the relationships between software development tools data and tour templates. In one embodiment, the test generator 100 may compare the tour description, tags, and/or keywords in each tour template with software development tools data to identify CSIs relevant to each type of tour specified in the tour templates and combine the matching CSIs with the tour descriptions in the tour templates to generate exploratory tests 150, similar to the discussion above with respect to the match configurations 130. For example, the test generator 100 may match the description, tags, and/or keywords in the tour templates with code repository comments, defect descriptions, titles, and the like. In the case of the UI tour, assume for example that the tour template includes a description discussed above and/or the following tags/keywords: UI, panel, layout, rendering, colors, graphical objects, animation, scrolling. The test generator 100 may match such a description or tags/keywords with, e.g., a development story entitled "New UI panel for topology graphs" as "UI panel" appears in this text, or with any other comments, descriptions, titles, etc. in the software development tools data, and then extract the associated CSI(s).

Figure 3:
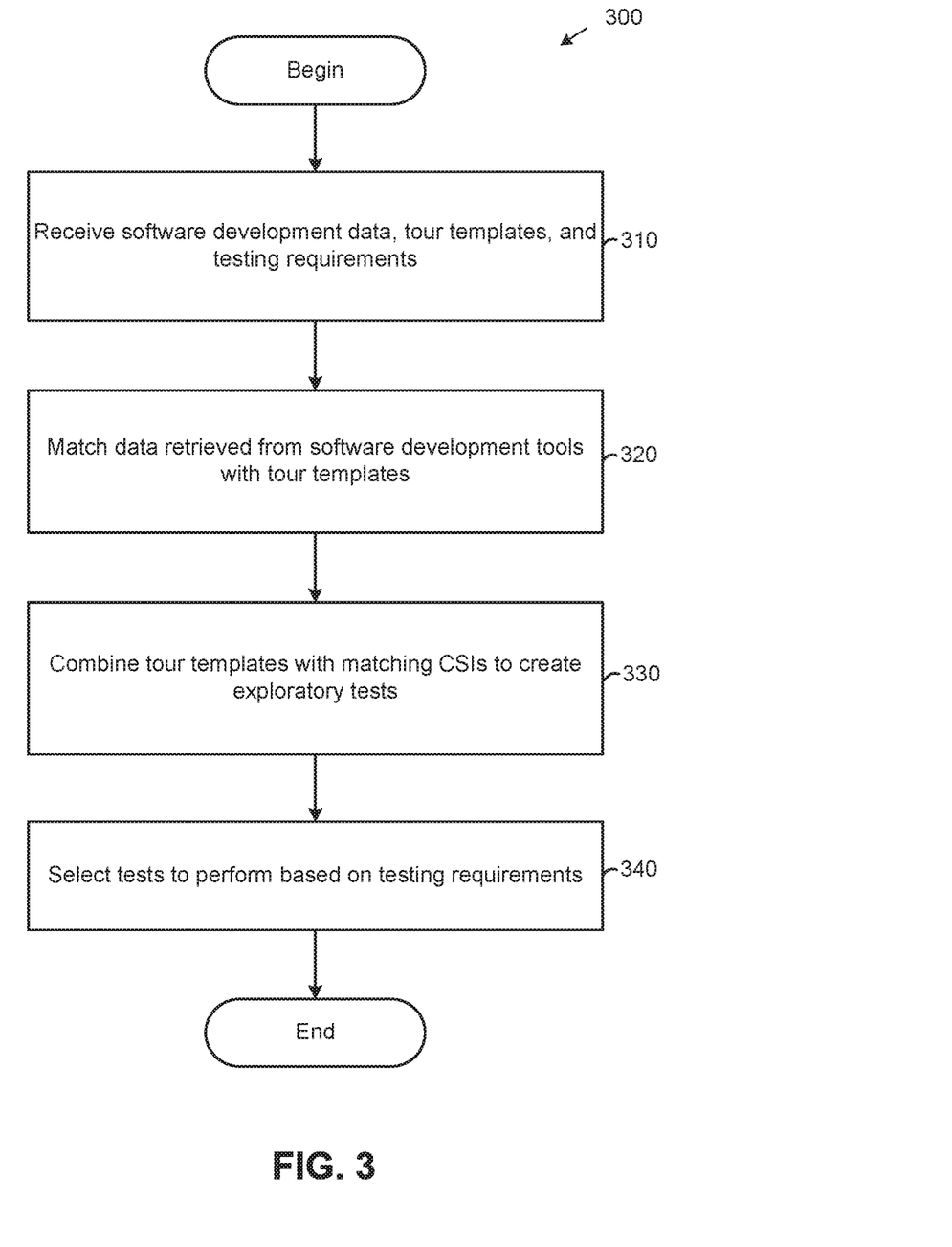
FIG. 3 illustrates a method for creating a software test plan, according to an embodiment.

FIG. 3 illustrates a method for creating a software test plan, according to an embodiment. As shown, the method 300 begins at step 310, where the test generator 100 receives as input testing requirements, tour templates, and software development tools data. As discussed, the testing requirements may include the release to be tested, timeframe for testing, and team capacity. Further, the tour templates are repositories or files with descriptions of particular types of tours, and/or tags/keywords associated with those tours, and the development tool data may include data from any tool used in developing and testing software, such as code repositories, test repositories, test management tools, test execution records, CSI risk maps, defects tracking tools, defect repositories, PMR/APAR repositories, software documentation, test automation framework tools, and the like.

At step 320, the test generator 100 matches data retrieved from the software development tools with the tour templates. In one embodiment, the matched data may include CSIs that the test generator 100 matches with the tour templates. In such a case, the test generator 100 may take as input match configurations 130 that map the tour templates to queries for selecting the CSIs relating to those tour templates from the development tools data, and the test generator 100 may then execute those queries to extract CSIs matching the tour templates. Alternatively, the test generator 100 may use text matching algorithms or modules, such as a machine learning algorithm or a text analytics tool, to compare the description, tags, and/or keywords in each tour template with the development tools data such as comments, descriptions, and titles, and extract CSIs relevant to each tour template based on the comparison. In some embodiments, development tools data may be queried to identify portions of code with the most changes and smallest number of defects and corresponding CSIs matched with an in-depth tour template, ODC user interface data may be queried to identify portions of code with user interface-related issues and corresponding CSIs matched with a UI tour template, defects repository data may be queried to identify portions of the code prone to bugs and corresponding CSIs matched with a buggy code tour template, CSI risk map data may be queried to identify where hidden defects in the code are expected to be and corresponding CSIs matched with an areas-of-interest tour template, ODC platform data may be queried to identify portions of the code with platform issues and corresponding CSIs matched with a platform/settings compatibility tour template, PMR/APAR data documenting previous issues may be queried to identify maintenance/installation instructions from the software documentation associated with data documenting previous customer issues and corresponding CSIs matched with a maintenance functions tour template, and historical data may be queried to identify failed long run tests and corresponding CSIs matched with an extended execution tour, as discussed above with respect to FIG. 2.

At step 330, the test generator 100 combines tour templates with matching CSI(s) to create exploratory tests. As discussed, each tour template includes a description of the type of tour but is otherwise empty and lacks specific attractions (e.g., CSIs) for which the tour should be performed. The test generator 100 may generates a repository or file which includes the description from a tour template and the CSI(s) matching the tour template so that a software tester can perform tour(s) based on the description provided and the matching CSI(s) that are listed. That is, the test generator 100 defines the exploratory tests using the tour descriptions and corresponding lists of CSI(s) to check, thereby creating test scenarios that combine tour schema (the descriptions) with attractions (features in the CSI lists). For example, the matching CSI(s) may be added to the tour template file or repository, which would then specify both the description of the tour (and/or keywords/tags) to perform and the CSIs on which the tours should be performed. In another embodiment, all of the tour descriptions and matching CSIs may be listed in one test plan file or repository that is provided to the software tester or testing team.

At step 340, the test generator 100 selects tests to run based on received testing requirements. In one embodiment, the test generator 100 may rank the tests it creates and determine a number of highest ranking test that can be executed given the timeframe and capacity specified by the user. In one embodiment, the test generator 100 may rank the tests based on previously reported issues covered by the tests' tours. In such a case, the test generator 100 may rank exploratory tests covering code with more previously reported issues higher and then select the highest ranking test tours whose time requirements add up to less than the total testing capacity, which as discussed may be the timeframe multiplied by the capacity. As a result, code with more previously reported issues may be tested, and the tests can be performed within the total capacity limit. In another embodiment, the test generator 100 may filter the tests at different levels, such as filtering the tour types in the tours template repository and filtering the actual tour tests that are created, based on input or feedback from customers or on the number of issues reported for particular CSIs/tests.

In another embodiment, the software testers may assign weights/marks (e.g., 1-3) to the selected test tours after performing them to improve the creation and/or selection of future test tours based on the previous testing performance. For example, a test tour that runs perfectly may be assigned a mark of 3, and a test tour that runs poorly may be assigned a mark of 1, and these marks may be used in the process of tours creation or selection/reduction to not create or select tests that have already run perfectly before.

Figure 4:
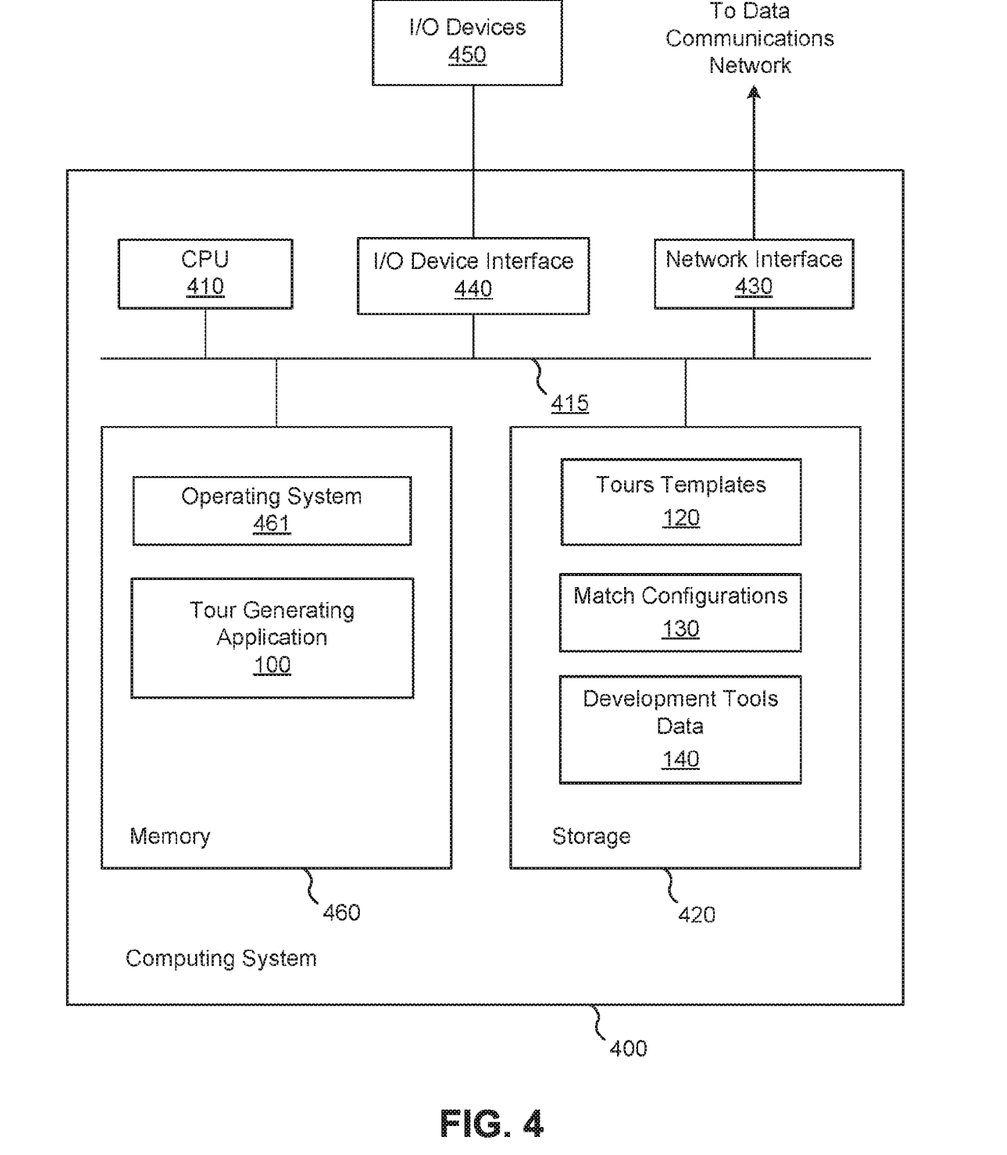
FIG. 4 illustrates a computer system in which an embodiment may be implemented.

FIG. 4 illustrates a computer system 400 in which an embodiment of this disclosure may be implemented. As shown, the system 400 includes, without limitation, a central processing unit (CPU) 410, a network interface 430, an interconnect 415, a memory 460 and storage 420. The system 400 may also include an I/O device interface 440 connecting I/O devices 450 (e.g., keyboard, display and mouse devices) to the system 400.

The CPU 410 retrieves and executes programming instructions stored in the memory 460. Similarly, the CPU 410 stores and retrieves application data residing in the memory 460. The interconnect 415 facilitates transmission, such as of programming instructions and application data, between the CPU 410, I/O device interface 440, storage 420, network interface 430, and memory 460. The CPU 410 is representative of one or more of a single CPU, multiple CPUs, a single CPU having multiple processing cores, and the like. And the memory 460 is generally included to be representative of a random access memory. The storage 420 may be a disk drive storage device. Although shown as a single unit, the storage 420 may be a combination of fixed or removable storage devices, such as fixed disc drives, flash drives, removable memory cards or optical storage, network attached storage (NAS), or a storage area-network (SAN). Further, the system 400 is included to be representative of a physical computing system as well as virtual machine instances hosted on a set of underlying physical computing systems. Further still, although shown as a single computing system, one of ordinary skill in the art will recognized that the components of the system 400 shown in FIG. 4 may be distributed across multiple computing systems connected by a data communications network.

As shown, the memory 460 includes an operating system 461 and the test generating application 100. Illustratively, the operating system 461 may be Linux® or Microsoft Windows®. The test generator 100 is configured to analyze development tool data and create exploratory tests based on matchings of the development tool data to testing tour templates. In one embodiment, the test generator 100 may receive testing requirements, tour templates, and software development tools data; match data from the software development tools with the tour templates; combine tour templates with matching CSI(s) to create exploratory tests; and select tests to run based on the received testing requirements, according to the method 300 discussed above with respect to FIG. 3.

Although discussed above primarily with respect to tests performed prior to release of a software product, techniques disclosed herein may also be applied to generate exploratory tests for other phases of software development. For example, tests may also be created and performed in the middle of software development.

Advantageously, techniques disclosed herein generate exploratory software tests automatically, rather than relying on manual brainstorming. As a result, the tests may be created in much less time (e.g., within minutes rather than days). Doing so permits high-quality software to be delivered quickly in, e.g., the continuous delivery case in which releases of software are iterative and frequent.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of generating a test plan for testing software, comprising:
receiving one or more templates, wherein each of the one or more templates specifies a respective type of test tour, wherein each of the one or more templates does not specify a specific portion of source code, but includes respective keywords to be used to identify relevant portions of source code, and wherein the one or more templates comprise at least one of:
a first matching configuration that matches components, subcomponents, and impact information (CSIs) with a buggy code tour template based on a query of defects repository data identifying portions of the software prone to bugs;
a second matching configuration that matches CSIs with an areas-of-interest tour template based on a query of CSI risk map data identifying where defects in the software are expected to be; or
a third matching configuration that matches CSIs with an extended execution tour based on a query of historical data identifying failed tests;
retrieving data relating to a software project from one or more software development tools, wherein the retrieved data includes comments associated with one or more portions of software in the software project;
identifying one or more portions of software in the software project, based on matching the respective keywords from each of the one or more templates with the comments included in the retrieved data relating to the software project, wherein the comments include descriptions of defects that are matched with the one or more templates using machine learning;
generating a plurality of test tours for the software project based on the one or more templates, wherein each of the plurality of test tours specifies a pattern of testing to perform on at least one of the identified one or more portions of software;
determining a number of issues associated with each of the identified one or more portions of software, wherein each of the issues were previously reported by one or more users of the software project; and
ranking the plurality of test tours based on the determined number of issues.

2. The method of claim 1, wherein each of the one or more templates includes at least one of: (i) a description of a respective type of test tour, (ii) tags associated with the respective type of test tour, or (iii) keywords associated with the respective type of test tour.

3. The method of claim 2, wherein matching the software development tools data with the one or more templates includes matching the descriptions, tags, or keywords in the template with at least one of comments, descriptions, or titles in the development tools data using machine learning.

4. The method of claim 1, wherein matching the software development tools data with the one or more templates includes querying the software development tools data based on predefined matching configurations.

5. The method of claim 4, wherein the predefined matching configurations include one or more of:
a fourth matching configuration that matches CSIs with an in-depth tour template based on a query of the software development tools data identifying portions of the software with a largest number of changes and smallest number of defects;
a fifth matching configuration that matches CSIs with a user interface tour template based on a query of orthogonal defect classification (ODC) user interface data identifying portions of the software with user interface-related issues;
a sixth matching configuration that matches CSIs with a platform/settings compatibility tour template based on a query of ODC platform data identifying portions of the software with platform issues, and
a seventh matching configuration that matches CSIs with a maintenance functions tour template based on a query identifying maintenance/installation instructions from software documentation associated with data documenting previous customer issues.

6. The method of claim 1, further comprising:
determining a capacity of a team assigned to complete the plurality of test tours;
determining a time requirement of each of the plurality of test tours; and
selecting one or more of the plurality of test tours to be completed by the team.

7. The method of claim 6, wherein the selecting is further based on information indicating performance of the generated test tours which have been performed in the past.

8. The method of claim 1, wherein generating the test tours includes combining the one or more templates with matching software development tools data.

9. The method of claim 8, wherein a combination of one of the templates with the matching software development tools data includes a description of the type of tour specified by the one of the templates and a list of attractions which includes matching components, subcomponents, and impact information (CSIs) for which the type of tour is to be performed.

10. A computer-readable storage medium storing a program, which, when executed by a processor performs operations for generating a test plan for testing software, the operations comprising:
receiving one or more templates, wherein each of the one or more templates specifies a respective type of test tour, and wherein each of the one or more templates does not specify a specific portion of source code, but includes respective keywords to be used to identify relevant portions of source code, and wherein the one or more templates comprise at least one of:
a first matching configuration that matches components, subcomponents, and impact information (CSIs) with a buggy code tour template based on a query of defects repository data identifying portions of the software prone to bugs;
a second matching configuration that matches CSIs with an areas-of-interest tour template based on a query of CSI risk map data identifying where defects in the software are expected to be; or
a third matching configuration that matches CSIs with an extended execution tour based on a query of historical data identifying failed tests;
retrieving data relating to a software project from one or more software development tools, wherein the retrieved data includes comments associated with one or more portions of software in the software project;

identifying one or more portions of software in the software project, based on matching the respective keywords from each of the one or more templates with the comments included in the retrieved data relating to the software project, wherein the comments include descriptions of defects that are matched with the one or more templates using machine learning;

generating a plurality of test tours for the software project based on the one or more templates, wherein each of the plurality of test tours specifies a pattern of testing to perform on at least one of the identified one or more portions of software;

determining a number of issues associated with each of the identified one or more portions of software, wherein each of the issues were previously reported by one or more users of the software project; and ranking the plurality of test tours based on the determined number of issues.

11. The computer-readable storage medium of claim 10, wherein each of the one or more templates includes at least one of a description of a respective type of test tour, tags associated with the respective type of test tour, or keywords associated with the respective type of test tour.

12. The computer-readable storage medium of claim 11, wherein matching the software development tools data with the one or more templates includes matching the description, tags, or keywords in the templates with at least one of comments, descriptions, or titles in the development tools data using machine learning.

13. The computer-readable storage medium of claim 10, wherein matching the software development tools data with the one or more templates includes querying the software development tools data based on predefined matching configurations.

14. The computer-readable storage medium of claim 13, wherein the predefined matching configurations include one or more of:

a fourth matching configuration that matches CSIs with an in-depth tour template based on a query of the software development tools data identifying portions of the software with a largest number of changes and smallest number of defects;

a fifth matching configuration that matches CSIs with a user interface tour template based on a query of orthogonal defect classification (ODC) user interface data identifying portions of the software with user interface-related issues;

a sixth matching configuration that matches CSIs with a platform/settings compatibility tour template based on a query of ODC platform data identifying portions of the software with platform issues, and a seventh matching configuration that matches CSIs with a maintenance functions tour template based on a query identifying maintenance/installation instructions from software documentation associated with data documenting previous customer issues.

15. The computer-readable storage medium of claim 10, wherein generating the test tours includes combining the one or more templates with the matching software development tools data.

16. The computer-readable storage medium of claim 15, the operations further comprising:

determining a capacity of a team assigned to complete the plurality of test tours;

determining a time requirement of each of the plurality of test tours; and selecting one or more of the plurality of test tours to be completed by the team.

17. The computer-readable storage medium of claim 15, wherein the combination of one of the templates with the matching software development tools data includes a description of the type of tour specified by the one of the templates and the list of attractions which includes matching components, subcomponents, and impact information (CSIs) for which the type of tour is to be performed.

18. A system, comprising:

a processor; and a memory, wherein the memory includes an application program configured to perform operations for generating a test plan for testing software, the operations comprising:

receiving one or more templates, wherein each of the one or more templates specifies a respective type of test tour, wherein each of the one or more templates does not specify a specific portion of source code, but includes respective keywords to be used to identify relevant portions of source code, and wherein the one or more templates comprise at least one of:

a first matching configuration that matches components, subcomponents, and impact information (CSIs) with a buggy code tour template based on a query of defects repository data identifying portions of the software prone to bugs, a second matching configuration that matches CSIs with an areas-of-interest tour template based on a query of CSI risk map data identifying where defects in the software are expected to be, or a third matching configuration that matches CSIs with an extended execution tour based on a query of historical data identifying failed tests, retrieving data relating to a software project from one or more software development tools, wherein the retrieved data includes comments associated with one or more portions of software in the software project, and identifying one or more portions of software in the software project, based on matching the respective keywords from each of the one or more templates with the comments included in the retrieved data relating to the software project, wherein the comments include descriptions of defects that are matched with the one or more templates using machine learning;

generating a plurality of test tours for the software project based on the one or more templates, wherein each of the plurality of test tours specifies at least a pattern of testing to perform on at least one of the identified one or more portions of software, determining a number of issues associated with each of the identified one or more portions of software, wherein each of the issues were previously reported by one or more users of the software project, and ranking the plurality of test tours based on the determined number of issues.

* * * * *